US008885539B2

(12) United States Patent
Trudeau et al.

(10) Patent No.: US 8,885,539 B2
(45) Date of Patent: Nov. 11, 2014

(54) CONFIGURABLE QUALITY-OF-SERVICE SUPPORT PER VIRTUAL ACCESS POINT (VAP) IN A WIRELESS LAN (WLAN) ACCESS DEVICE

(75) Inventors: Pierre Trudeau, Lorraine (CA); Stephane Laroche, Lasalle (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 2841 days.

(21) Appl. No.: 10/905,922

(22) Filed: Jan. 26, 2005

(65) Prior Publication Data

US 2006/0165103 A1    Jul. 27, 2006

(51) Int. Cl.
*H04L 12/56* (2006.01)
*H04L 12/28* (2006.01)

(52) U.S. Cl.
CPC ............................. *H04L 12/2854* (2013.01)
USPC ........................ 370/315; 370/235; 370/412

(58) Field of Classification Search
CPC ..... H04L 12/5693; H04L 47/10; H04L 47/30; H04L 47/2441; H04L 49/90; H04B 7/155; H04B 7/2606; H04W 88/04
USPC ......... 370/401, 402, 404, 412, 418, 431–440, 370/235, 315
See application file for complete search history.

(56) References Cited

U.S. PATENT DOCUMENTS

| 6,404,772 | B1* | 6/2002 | Beach et al. | 370/443 |
| 6,804,222 | B1* | 10/2004 | Lin et al. | 370/338 |
| 6,822,940 | B1* | 11/2004 | Zavalkovsky et al. | 370/237 |
| 2002/0023080 | A1* | 2/2002 | Uga et al. | 707/1 |
| 2002/0176431 | A1* | 11/2002 | Golla et al. | 370/412 |
| 2005/0025167 | A1* | 2/2005 | Ishibashi et al. | 370/412 |
| 2006/0046730 | A1* | 3/2006 | Briancon et al. | 455/446 |
| 2006/0221884 | A1* | 10/2006 | Fielding et al. | 370/316 |
| 2008/0019329 | A1* | 1/2008 | Benveniste | 370/337 |
| 2008/0228942 | A1* | 9/2008 | Lor et al. | 709/238 |

* cited by examiner

*Primary Examiner* — Marsha D Banks Harold
*Assistant Examiner* — Matthew Campbell

(57) ABSTRACT

A wireless network access device includes a radio and support for virtual access points. According to the invention, each virtual access point has an independently configurable quality-of-service profile. The per-VAP QoS support enables multiple services to be delivered from a single physical access point. A plurality of transmit/receive queues are associated with each virtual access point (VAP) configured on the access device. Each queue in the plurality of queues is associated with a given quality-of-service level, such as (in decreasing order of priority): voice, video, best effort data, and background data. The access device further includes a data transfer mechanism in the form of a data packet forwarding engine that, for each VAP, transfers data from the plurality of queues to enforce the per-VAP QoS policy.

20 Claims, 6 Drawing Sheets

CONFIGURABLE QUALITY-OF-SERVICE SUPPORT PER VIRTUAL ACCESS POINT (VAP) IN A WIRELESS LAN (WLAN) ACCESS DEVICE

BACKGROUND OF THE INVENTION

The present invention relates generally to creating and managing wireless networks.

An access point is a device that acts as a central point between a wireless and a wired network. A "virtual" access point is a logical entity that exists within a physical access point. When a single physical access point supports multiple virtual access points, each virtual access point appears to mobile stations (STAs or clients) to be an independent physical access point. Each multiple virtual access point that exists within a single physical access point may advertise a distinct unique identifier (a Service Set Identifier, or SSID) and capability set. Alternatively, multiple virtual access points can advertise the same SSID each with a different capability set, which allows access to the network to be provided via diverse security schemes. Through virtual access points, a single provider may offer multiple services, as well as enabling multiple providers to share the same physical infrastructure. Support for virtual access points is particularly useful when a Wi-Fi infrastructure needs to be shared between public and private users, or to allow a number of wireless ISPs (WISPs) to share a common broadband and Wi-Fi infrastructure at a given set of locations to lower capital and operational expenses while leveraging the available broadband connection.

Wireless technology standards, such as IEEE 802.11, only allow a mobile client to associate with a single access point and a single SSID. Thus, to support multiple SSIDs within a distinct access point, it has been suggested that the access point use multiple BSSIDs, where a BSSID is a so-called basic service set identifier (BSSID). A BSSID is an identity used to identify a particular BSS (Basic Service Set) within an area. Typically, the SSID is the MAC (Medium Access Control) address of the access point. In this approach, the AP uses multiple BSSIDs, but each beacon or probe response contains only a single SSID. The AP sends beacons for each virtual access point (VAP) that it supports at a standard beacon interval, using a unique BSSID for each VAP. The access point then responds to probe requests for supported BSSIDs with a probe response, which may include the capabilities corresponding to each BSS. Further details of this approach are provided in the article titled "*Virtual Access Points*," by Bernard Aboba, Submission to IEEE P802.11, March 2003.

Thus, although it is known in the art to describe an access point device that can support multiple distinct SSID values over a single radio with unique MAC addresses per SSID (i.e., BSSID), there remains a need in the art to show how such devices may be used to provide independently configurable and flexible quality-of-service for a variety of client devices.

The present invention addresses this need.

BRIEF SUMMARY OF THE INVENTION

An object of the present invention is to provide a wireless network access device having virtual access point (VAP) support, wherein each virtual access point has an independently configurable quality-of-service profile.

Another object of the invention is to provide a wireless access point (AP) with an architecture that supports per VAP quality-of-service (QoS), and that provides management and control of end-to-end quality of service, whether or not a particular client device that connects to the AP is QoS-capable.

According to an embodiment of the invention, an access point (AP) supports multiple distinct SSID values over a single radio with unique MAC addresses per SSID (i.e., BSSID) to provide support for one or more virtual access points. A plurality of transmit/receive queues is associated with each virtual access point (VAP) configured on the AP. Each queue in the plurality of queues is associated with a given quality-of-service level, such as (in decreasing order of priority): voice, video, best effort data, and background data. The access point further includes a data transfer mechanism in the form of a data packet forwarding engine that, for each VAP, transfers data from the plurality of queues to enforce a per VAP QoS policy, e.g., by applying different priorities to the queues.

According to another aspect of the invention, a method of connecting a set of client devices to a given wired network uses an access device that includes a radio configurable to support virtual access points. The method begins by associating each client device to a given virtual access point (VAP). For each VAP, given traffic is then assigned to one or more quality-of-service levels. As the client device communicates over the given network, the device enforces a given per VAP quality-of-service policy. In this embodiment, a given client device is a legacy client (i.e., a STA or client unable or unwilling to explicitly participate in a quality of service protocol over the wireless network), or a QoS-enabled client (a STA or client taking an active role in requesting and enforcing a QoS protocol over the wireless network).

The per-VAP QoS support enables multiple services to be delivered from a single physical access point, customized to application requirements. Preferably, SSID broadcasts are selectable, which enables a user to select a given service. VLAN per SSID enables support for secure wholesaling. In addition to providing per-VAP QoS support, preferably client authentication security policy (e.g., WPA/WPA2, WEP, VPN or OPEN security) is independently selectable and configurable. This enables the operator to tailor its security policy to resources available on a VLAN.

The per-VAP quality of service (QoS) function enables support for legacy user devices (STAs) that do not take an active role with regard to defining or enforcing quality of service. In this scenario, a VAP can be configured to operate at a specific QoS level for all the traffic on the associated BSSID. In such case, the VAP enforces the required queuing policies as if the devices were to actively mark the traffic (such as with IEEE 802.11e, IEEE 802.1p or DiffServ).

The present invention also allows for the mapping of a wireless QoS policy onto an upstream (typically wired) interface. This is independent of the wireless QoS method defined for a specific VAP. Such QoS typically comprises priority queuing along with layer-2 (IEEE 802.1p) or layer-3 (DiffServ or TOS) markings to allow end-to-end QoS between the client device and the remote destination.

To further prioritize traffic within a given class of service, the present invention may enforce a given quality of service priority rule (within a given VAP) with respect to a destination port as defined in TCP (RFC 793) and UDP (RFC 768). This is quite useful when a client device supports multiple connections or streams over a single VAP, and where there is no explicit QoS tagging to indicate the relative priority between these streams or connections.

The VAP data packet forwarding engine preferably supports multiple/different streams or connections on a legacy user device unable to support 802.11e (WMM). When the user device is unable to explicitly tag its traffic for a given QoS, each VAP can be instructed (e.g., via configuration or as part of a user profile extracted from a AAA Server during authentication) about the priority to assign to different ports or protocols; this function mimics the capabilities offered by IEEE 802.11e without any involvement by the user device.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
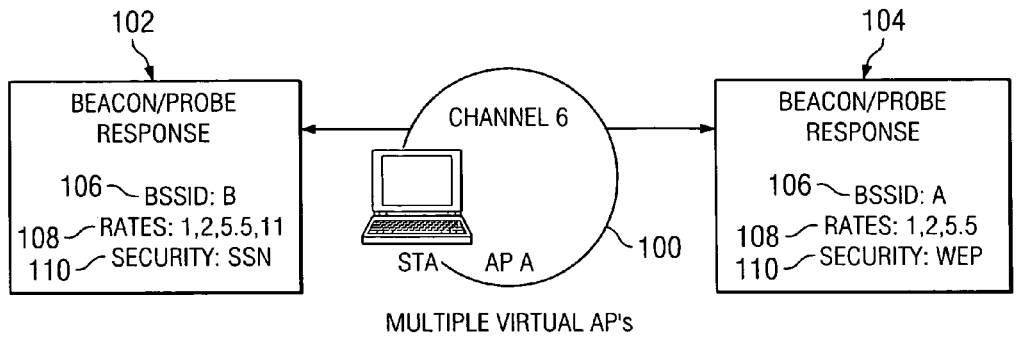
FIG. 1 illustrates how a physical access point (AP) supports one or more virtual access points.

The basic concept of a virtual access point is illustrated in FIG. 1. In this example, there is an access point 100 that supports first and second virtual access points 102 and 104. Each virtual access point (VAP) emulates the operation of a physical access point at the MAC layer. In particular, each VAP emulates the MAC layer behavior of the physical AP by operating with a distinct BSSID 106 and, optionally, distinct capability advertisements 108 and default key sets 110. Each VAP may also exhibit distinct application behavior (at the application layer), and be reachable via a distinct domain name (at the IP layer). To provide this support, it is assumed that mobile stations can discover the SSIDs, that each VAP can advertise its own set of capabilities, and that each VAP can be allocated to a unique VLAN.

Figure 2:
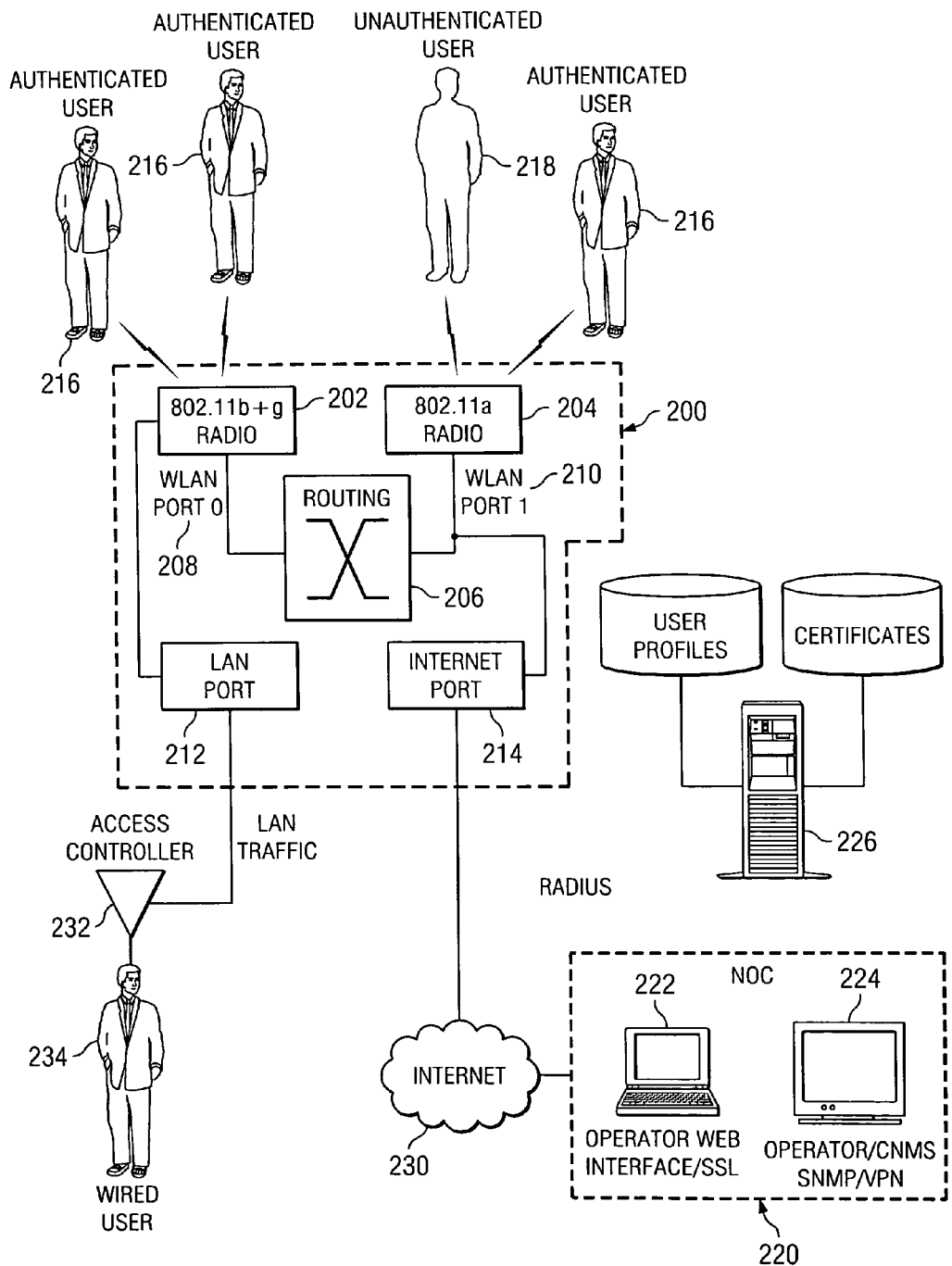
FIG. 2 illustrates a representative WLAN environment (and its associated interfaces) in which the present invention may be implemented.

FIG. 2 illustrates a representative WLAN environment (and its associated interfaces) in which the present invention may be implemented. WLAN refers to a wireless local area network, typically based on IEEE 802.11 technology. Users access the WLAN using client devices (e.g., dual-mode cell phones, laptops or PDAs with a Wi-Fi NIC). In this example, an access point 200 has first and second radios 202 and 204, with the first radio 202 configured to be IEEE 802.11b+g compliant and the second radio 204 configured to be IEEE 802.11a compliant. This software-configurable dual-band radio structure is merely illustrative, as it allows users with different hardware requirements to connect to the device simultaneously and to share the AP resources. The invention may be implemented in an access point with only a single radio interface. The access point 200 comprises a pair of WLAN ports 208 and 210, a LAN port 21 2, and an Internet port 214. A LAN switch 206 (with 802.1q and 802.1p support) interconnects these ports. One or more authenticated users 216 are allowed to send and receive traffic via the Internet port 214. In this context, the Internet port refers to any IP network (public or private) and is not restricted to the Internet. From a user point of view, a WLAN port (e.g., port 208) acts as an interface to the Internet. The access point can monitor and report activity for the authenticated users to a management system. Reported accounting information can be used to measure the quality of service provided to a customer or to enforce an enterprise private network policy. An unauthenticated or unauthorized user 218 is not allowed to access the device resources until properly authenticated. The authenticated user 218 may be able to see the access point 200 as a remote peer, however; traffic from/to the unauthorized user will be ignored or silently discarded by the access point. From a system point of view, unauthorized users should be seen as a potential threat. For security reasons, the access point should monitor and report any activity from the unauthorized users to a management system. To this end, a Network Operations Center (NOC) 220 may be provided and administered by an operator or the IT staff of an enterprise. In particular, the operator is a network manager that monitors or controls devices in the network, such as the access point 200. In this illustrated embodiment, the operator may be a person directly connected to the access point via a Web connection 222 or a management system console 224 using SNMP. The SNMP interface 224 is useful for monitoring the activity of the access point. Sufficient monitoring attributes should be available to the SNMP management platform to gather useful information from the device. The information retrieved from SNMP may vary but typically includes statistics on the communication interfaces, such as the number of packets transmitted or received. This interface may also expose the status on each authenticated user. Configurable event notifications could also be used to indicate any anomaly in the network use. The web-based 222 interface provides a convenient way to configure the access point.

Typically, a Remote Access Dial-In User Server (RADIUS) 226 is used to control authentication, accounting and access control of the users to the access point 200. RADIUS is an IETF-defined client/server protocol and software that enables remote access servers to communicate with a central server to authenticate dial-in users and authorize their access to the requested system or service. Preferably, all user authentication and network service access information is located on the RADIUS server 226. Transactions between the access point 200 and the RADIUS accounting server 226 preferably are authenticated through the use of shared secrets. Moreover, for security reasons, typically user passwords are encrypted before being transmitted between the access point and the RADIUS server.

The Internet port 21 4 may be connected to the external network cloud or to an intranet, an enterprise LAN, or other network, designated here (for convenience only) as the Internet 230. The Internet port resource 214 typically is shared among all the authenticated users connected to the access point. Management or authentication information can also be present on the Internet port, e.g., through one or more secure connections to the access point. The LAN port 212 connects the device to other networks, e.g., an enterprise private network, typically through one or more other network peer devices. A representative network peer is another access point 232, as well as wired users 234 in the enterprise network. The WLAN port (208 or 210) typically is used to communicate with the users via the respective radio interface (202 or 204, as the case may be). As illustrated, there are as many WLAN ports as there are radio interfaces.

Although not illustrated in detail, the access device includes various software modules executing on a hardware and software platform, and suitable networking support. Thus, the access device may have native support for one or more of the following networking options: 802.1d compliant bridging, GRE (RFC 2784), DHCP Server (RFC 2131), DHCP Client, DHCP Relay, DHCP Option 82 (RFC 3046), PPPOE Client (RFC 2516), DNS Relay, Static IP routing, Network Address Translation (RFC 1631), one-to-one NAT for VPN support, RIP v1 (RFC 1058) and v2 (RFC 1723), SMTP (email) redirection, ICMP (RFC 792), ARP (RFC 826) and CIDR (RFC 1519). The device may also include suitable network management support software, such as: SNMP v1 and v2, MIB-II with TRAPS, MIB for user session control, RADIUS Authentication MIB (RFC 2618), RIP v2 extension MIB (RFC 1724), secure access (SSL and VPN) to an embedded HTML management tool, and real-time status, information and protocol traces (Layer 2 and Layer 3). The software may provide one or more access controller functions such as: secure HTML login page, support for centralized WEB portal, Web proxy server, fixed-IP address spoofing, support for 802.1x using EAP-SIM, EAP-TLS, EAP-TTLS and PEAP, MAC-level authentication for non-HTTP or 802.1x devices, RADIUS AAA using EAP-MD5 PAP, CHAP, MSCHAP v2, accounting based on session duration and/or data volume, support for pre-paid subscription, per-user customized firewall, Layer 2 wireless isolation, and support for concurrent authenticated users.

The access point 200 is enabled to implement virtual access points, namely, support for one or more multiple distinct SSID values over a single radio with unique MAC addresses per SSID (i.e., BSSID). As is known, an SSID is a field between 0 and 32 octets that may be included as an Information Element (IE) within management frames. In the context of the 802.11 standard, management frames supporting the SSID IE include the Beacon, Probe Request/Response, and Association/Reassociation Request frames. Preferably, the access point supports virtual access points (each a "VAP") using multiple BSSIDs. Each beacon or probe response contains only a single SSID IE. The access point sends beacons for each virtual access point that it supports at a beacon interval (e.g., typically 100 milliseconds), using a unique BSSID for each VAP. The access point responds to probe requests for supported SSIDs (including a request for the broadcast SSID) with a probe response including the capabilities corresponding to each BSSID. In one embodiment of the invention, the access point advertises up to a given number (e.g., 16) of beacons, each with a different BSSID to provide the VAP support. Each VAP has a unique MAC address, and each beacon has a network name.

Figure 3:
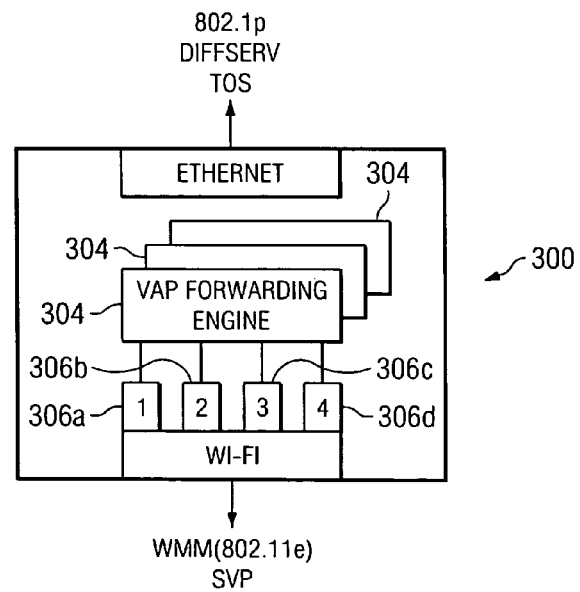
FIG. 3 is a simplified block diagram of an access device that provides per VAP QoS support according to an embodiment of the present invention.

According to the present invention, the access device provides a quality-of-service (QoS) support on a per virtual access point (per VAP) basis. In an illustrative embodiment, traffic that enters the access point from the wired or Internet port side may be classified into various categories (or service classes), in order of decreasing priority, namely: voice traffic (very high), video traffic (high), best effort data traffic (medium), and background data traffic (low). The above semantics are merely illustrative, as certain traffic (e.g., a videoconference) may fall into one or more classes. According to the invention, a given client device is associated with a given VAP, and this client-to-VAP association or mapping is maintained by the access point for all downstream (wired to wireless) and upstream (wireless to wired) data transfer. In one embodiment, a virtual access point (VAP) is assigned for each service class, and then given data is assigned a given priority (very high, high, medium or low). To support this functionality, and as illustrated in FIG. 3, the access point 300 includes a virtual access point forwarding engine 304 and a set of transmit queues 306. In this embodiment, there the four (4) transmit queues (306a-d) corresponding to the number of service classes. Preferably, each VAP has its own forwarding engine 304 and set of transmit queues 306. Data is en-queued and de-queued by the VAP forwarding engine. In this example, there are three (3) virtual access points (and, thus, 3 VAP forwarding engines), although this configuration is merely representative. The forwarding engine 304 may be conveniently implemented in software, or in special purpose hardware. The transmit queues may be implemented using hardware queues of a wireless transceiver chipset, such as the Atheros AR 5212 chipset. The queues also may be implemented in software.

Figure 4:
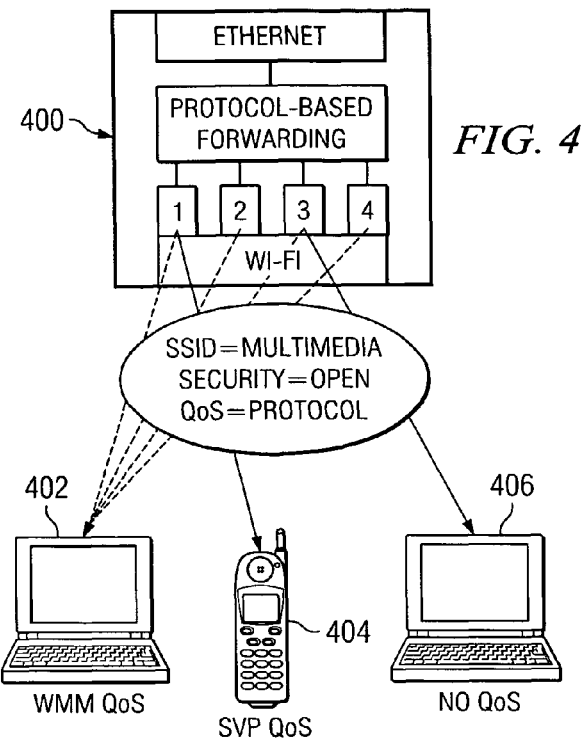
FIG. 4 is a simplified block diagram showing the access device providing per VAP QoS support for QoS-enabled clients.

According to the invention, a given client device is associated with a given virtual access point (VAP) of the access device. One or more quality-of-service classes are then associated with the given VAP, depending on the client device or device type. This provides significant advantages, especially when clients have native QoS support, such as illustrated in FIG. 4. In this embodiment, the access device 400 implements protocol-based forwarding per VAP. For example, in this embodiment, the laptop client 402 has 802.11e (Wi-Fi Multi-Media or WMM) support and thus may be afforded access to all four categories (and, thus, all four queues). Such a device might desire access to all QoS levels because, for example, the client may implement a softphone for voice over IP (very high), a supported media player may receive and display streaming video (high), an email client may send and receive email (best effort), and/or the machine may need to update its anti-virus software as needed or periodically (background). Another QoS-capable client 404, such as a dual-mode cellphone, is associated with a second VAP and has native SVP support. The Spectralink Voice Protocol (SVP) is a Spectralink proprietary protocol that provides interoperability with SpectraLink phones, and in this example is provided access to the very high (voice) service level. In contrast to these devices, client (a basic laptop without 802.11e support) 406 has no special quality-of-service support or functionality. It is associated with another VAP but with a lower transmit queue priority (in this case, best effort).

Figure 5:
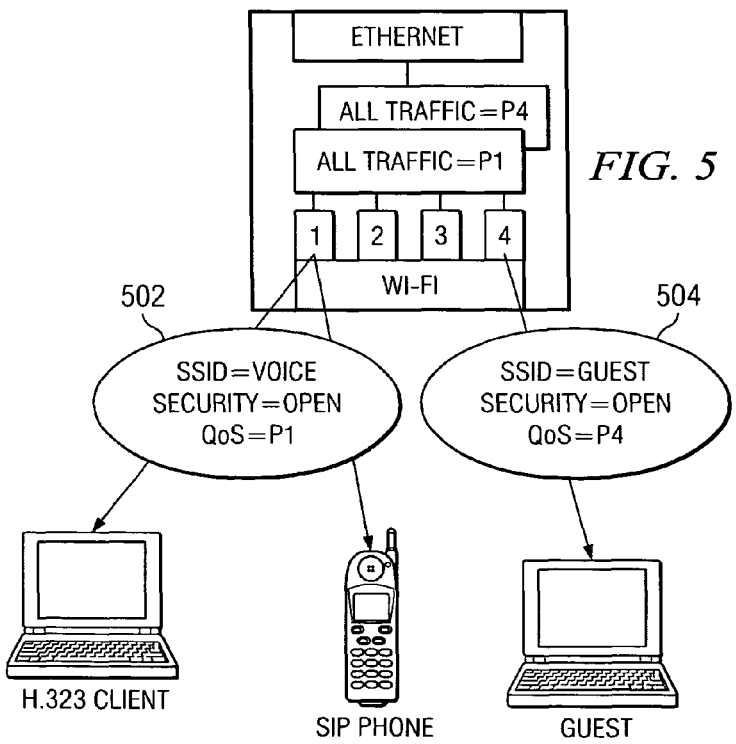
FIG. 5 is a simplified block diagram showing the access device providing per VAP QoS support for legacy client.

FIG. 5 illustrates how the access device provides QoS support for legacy clients. In this embodiment, all traffic (per VAP) is assigned one priority. Thus, in this example, all of the traffic for VAP 502 has priority P1 and all traffic for VAP 504 has priority P4. This enables legacy clients and applications to achieve priority queuing, and it enables specialized devices (e.g., lifeline monitors, handhelds, or the like) to receive priority. In this embodiment, the priority per VAP is configurable, which enables the network manager to administer priority for an entire network and affords easy differentiation between applications (e.g., guest access, employee, or the like).

Figure 6:
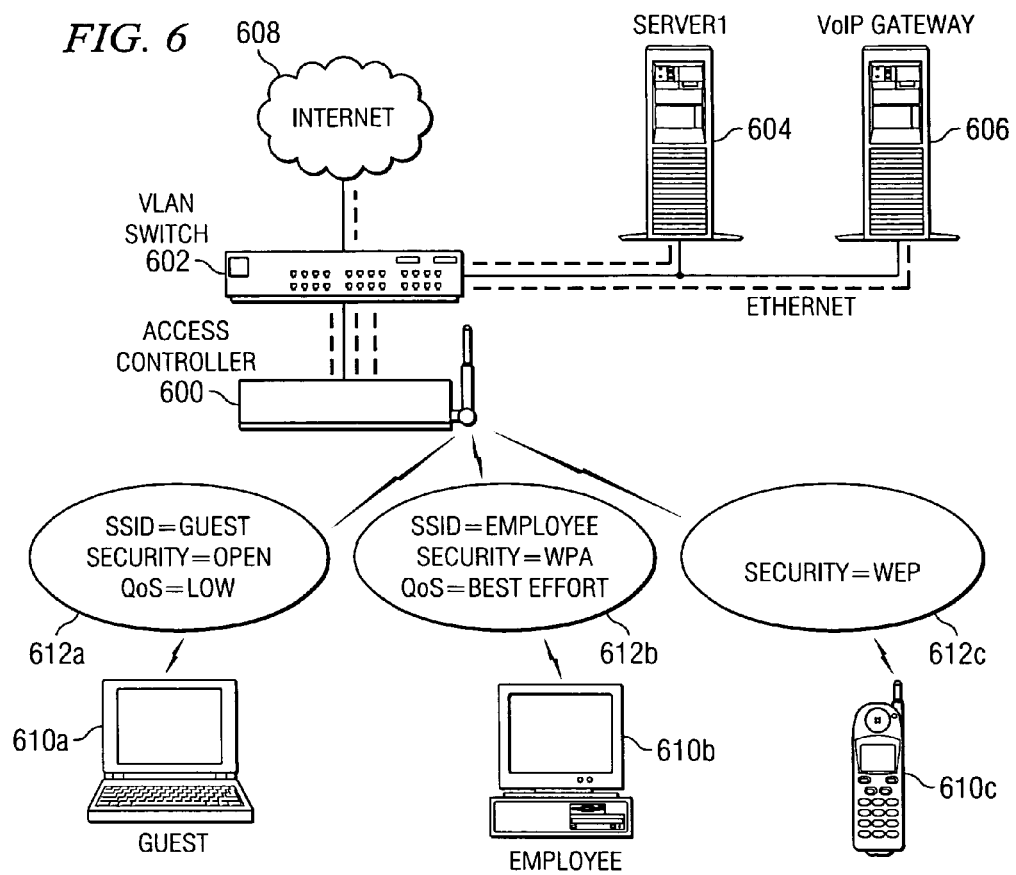
FIG. 6 further illustrates the how access point can provide QoS support on a per VAP basis in an existing Wi-Fi infrastructure.

FIG. 6 further illustrates how the access point can provide QoS support on a per VAP basis in an existing Wi-Fi infrastructure. The access point 600 is coupled to an existing infrastructure comprising a VLAN switch 602, which in turn is connectable via Ethernet to a server 604 and voice over IP gateway 606, and also to the Internet 608. A set of client devices 610a-c are connectable to the access device 600, and each client device 610 is associated with its own virtual access point (VAP) 612a-c. Thus, for example, client device 610a is a laptop that is provided with a SSID=GUEST, a security level of OPEN (unencrypted) a quality-of-service of LOW. Client device 610b is a desktop computer or workstation with SSID=EMPLOYEE, a security level set to WPA, and a quality of service of "Best Effort." Client device 610c is a cell phone with SSID=Voice, a security level of WEP, and a QoS of "Voice." These client devices are merely representative, as the access device may provide wireless service to any given client device. Representative client devices implement a wide variety of client authentication schemes, such as: SSL protected WEB-based authentication, 802.1x support (e.g., PEAP, EAP-TLS, EAP-TTLS, EAP-SIM and others), Wi-Fi Protected Access (WPA/WPA2) with TKIP or AES, support for static and dynamic IEEE 802.11 WEP keys (e.g., 40 bits, 128 bits, and the like). More generally, the access device provides per VAP QoS for any legacy and/or QoS-enabled clients and applications. An example of the latter would be a client such as a laptop with softphone capability that is 802.11e compliant (WMM). A WMM-compliant client provides open voice, video and data interoperability. A WMM device has the capability of tagging (with a User Priority (UP) tag) its traffic proactively to identify a given QoS. Legacy clients, in contrast, are those that do not include any QoS support (and/or do not tag their traffic), e.g., an H.323 client, a SIP phone, a conventional laptop. As will be seen, the access point provides per VAP QoS support for these legacy devices, and thus the present invention facilitates backwards compatibility. In operation, the access point has the capability of recognizing the client type (by tagging or otherwise) and directing the traffic to an appropriate priority queue for handling.

As illustrated in FIG. 6, each client device has the ability to negotiate and obtain its own unique security level (e.g., WPA/WPA2, WEP, OPEN, or the like) with respect to its associated VAP. Thus, in addition to providing per VAP QoS, the access device provides multiple levels of security per AP (one per VAP). This enables the device to tailor security policy to resources that are accessible on the VLAN. Thus, for example, with client 610a (the laptop), the VAP 612a is OPEN so the user is authenticated via a secure WEB login page; in contrast, the VAP 612b advertises support for WPA, which enables the client 612b (the desktop) to use 802.1x authentication along with WPA/TKIP encryption for the Wi-Fi link. VAP 612c advertises support for WEP, which enables the client 612c (the dual mode cell phone) to be protected by WEP without requiring user devices on other VAP to operate at the same (lower) security level. Of course, these examples are merely illustrative of the concept.

Data is transmitted from the queues per VAP according to the quality of service priority levels. Thus, when it comes time to transmit data to the client, the data in the highest priority queue is transmitted first, followed by transmission of the data in the next highest priority queue, until all the data has been transmitted or a given timeout has occurred. In this manner, the access device provides per VAP QoS support regardless of the type of client or authentication scheme, or any other particular service requirements.

In an illustrative embodiment, QoS support may be handled differently depending on the direction of traffic through the access point, although this is not a limitation of the invention. Downstream traffic is classified into one of the service classes as previously described. The traffic classification criteria may be either one of the following: VAP identifier (or BSSID), Layer 2 header, or Layer 3 header. A simple method of classifying traffic uses a different VAP identifier (or BSSID) for each traffic class. Multiple VAPs are then mapped to one or more of the traffic classes. Alternatively, traffic is classified on the basis of a VLAN priority field that is present within a VLAN header (802.1p). The VLAN priority field is used to map the data packet to the supported traffic types (e.g., VLAN priority 1, 2→background data, VLAN priority 0, 3→best effort data, VLAN priority 4, 5→video, VLAN priority 6, 7→voice). Traffic may also be classified using information from the Layer 3 header. Thus, for example, the IP TOS (type of service) or DSCP (Differentiated Service Control Protocol) priority field may be used to map the data packet to the supported traffic types (e.g., TOS 0×08, 0×20→background data, TOS 0×28, 0×08→video, TOS 0×30, 0×E0, 0×88, 0×B8→voice, everything else→best effort). Of course, the above classifications are merely exemplary.

For upstream packets, it is possible to mark or override the current marking within the Layer 2 and/or Layer 3 header. In particular, as part of the Layer 2 marking, the data packet's Layer 2 header may be modified to include priority within the 802.1p priority field, where 3 bits are available for priority. Such marking is preferably done for those VAPs for which VLANs are enabled, although this is not a limitation. For WMM clients on the wireless side, as noted above, the QoS traffic coming from these clients has a WMM QoS tag that identifies its priority order. A priority level may be from 0 to 7, as there are preferably 3 bits assigned for the QoS user priority tag. In operation, the priority is mapped directly onto the vlan priority as the data packet is sent to the wired LAN. Preferably, the QoS priority also determines the packet priority in accessing the wired LAN. In one embodiment, the access device advertises WMM capability to enable WMM clients to associate with the device. The device may also support a WMM triggered service power save mode. In this mode, the wireless client with high priority voice traffic can go into a power save mode where all its downlink frames are buffered at the access point in a highest priority power save queue. The access point then informs the wireless client of the client's current buffered frames status. The buffered frames are released when the wireless client emerges from power save mode and indicates its readiness to receive any buffered data from the access point.

The access point may also include an admission control mechanism that determines which clients get access to the network, and which do not. In particular, the access point may accept or reject the client, e.g., based on traffic specification requested by the client in an add traffic specification (AD-DTS) request. According to this aspect of the invention, the finite resources available to the entire set of VAPs within a physical AP need to be shared. Under load, it may be necessary to enforce admission control to guarantee a minimum level of services to user devices (STA) gaining access to the wireless LAN and requesting to be added to a specific VAP at a specific QoS level. The same admission control function is also required to handle handoff of client sessions between adjacent VAP without dropping the connection or stream, e.g., due to lack of resources.

By implementing QoS restrictions, the amount of bandwidth that a user consumes on the network may be limited, which is advantageous. A given user may have a "premium" subscription or profile on the network, which amount may be configured in RADIUS. If the configuration is not present in RADIUS, a VAP-defined premium configuration may be enforced. The bandwidth limitation preferably is enforced by the VAP forwarding engines and their associated transmission queues. A network administrator may apply or otherwise define a rate limitation under network congestion and a different rate limitation when the network has free bandwidth. In addition, it may be desirable to limit the transfer rate for data of a specific protocol. In a representative embodiment, the network administrator may specify a list of friendly protocols, which are protocols that maintain default privileges. When a protocol is not specified as friendly, the data transfer may then be defaulted to a lower (e.g., background) quality of service.

Figure 7:
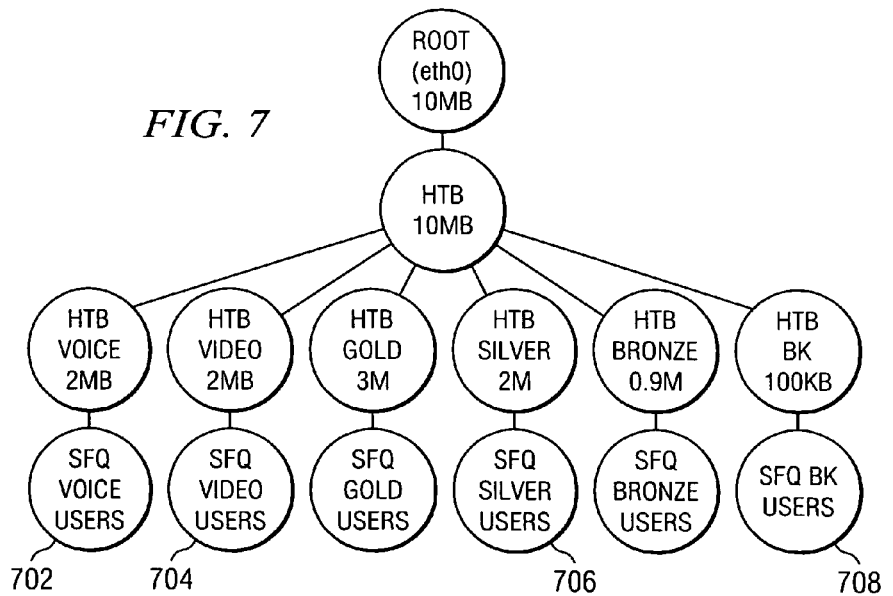
FIG. 7 illustrates how a network operator manages bandwidth per VAP within a given QoS level.

A network operator may also manage bandwidth within a given QoS level. FIG. 7 illustrates this concept. In this embodiment, a hierarchical bandwidth allocation scheme is implemented. In particular, the operator has specified the four (4) levels previously described, namely, voice 702, video 704, best effort data 706, and background 708; however, users within the best effort level 706 share the bandwidth depending on a given status (e.g., gold, silver or bronze). A given scheduling algorithm (e.g., hierarchical token bucket (HTB), start-time fair queuing (SFQ), or others) may be used to enforce how the bandwidth is shared among the different quality of service levels and to prioritize the traffic. The given algorithm may also be used within a given service level. For example, here the video QoS level has 2 Mb of bandwidth reserved for it. When more then one user/VAP is using the video QoS queue, the bandwidth between the user/VAP is shared according to the given algorithm, such as SFQ. In the best effort level, a certain bandwidth is specified per user group and then enforced. The illustrated hierarchy of user quality helps sharing bandwidth equitably. When some bandwidth is available, a given first algorithm (e.g., HTB) can be used to control the available bandwidth per priority. Within a given priority level, the bandwidth preferably is then shared in proportion to a given allocation, such as illustrated in FIG. 7. Preferably, the access point is configurable to limit the bandwidth that a given queue can use, which translates into a corresponding amount of bandwidth that can be borrowed. If there is only one bronze user when there is bandwidth congestion, the bronze user will still be able to get 1 Mb of data. Also, the sum of the amount of bandwidth for all child nodes in the bandwidth should not be greater than the bandwidth allocated to a parent node.

Figure 8:
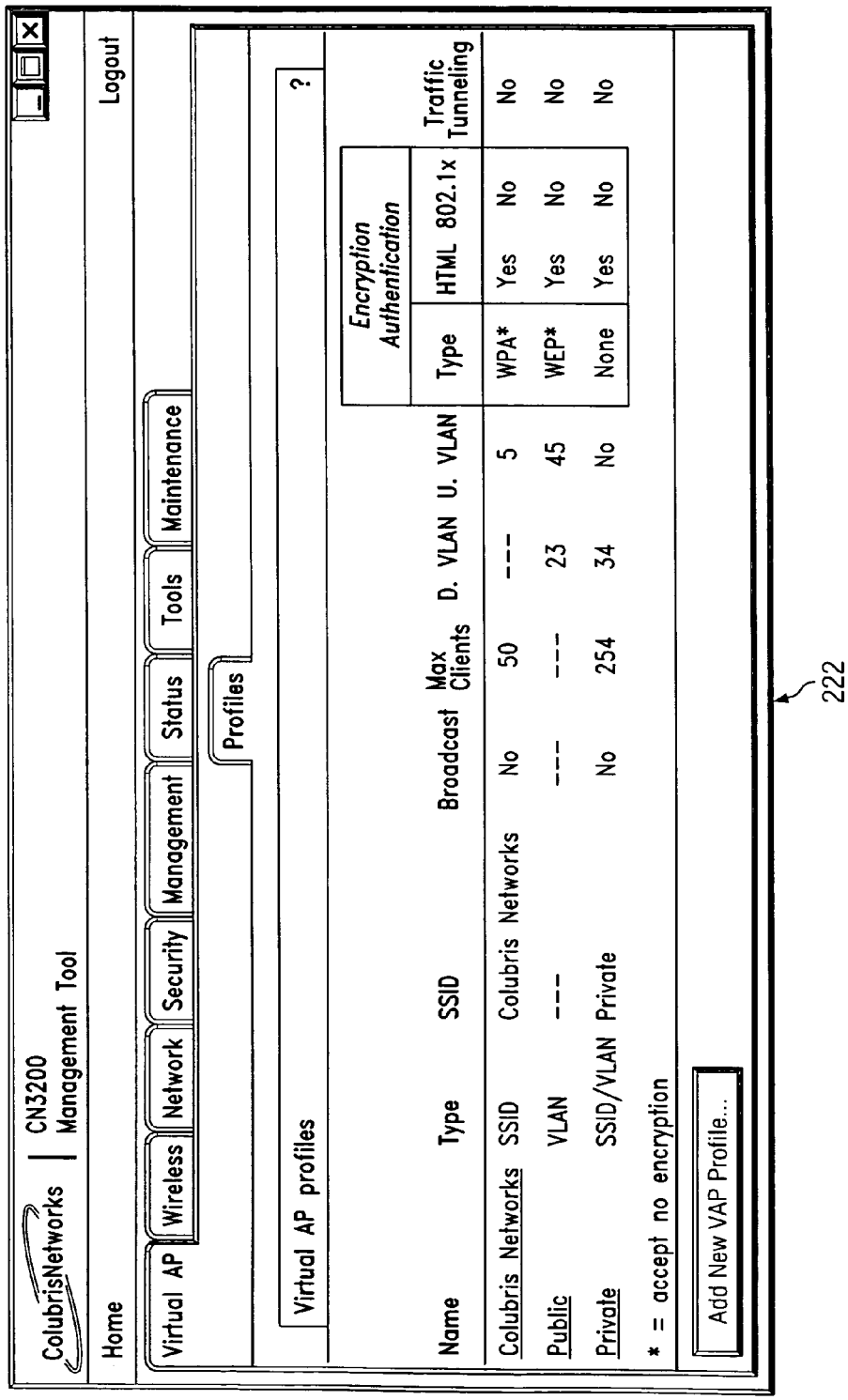
FIG. 8 is a representative Web-based interface through which an operator may select from a list of virtual access points that are configured on the access device.
Figure 9:
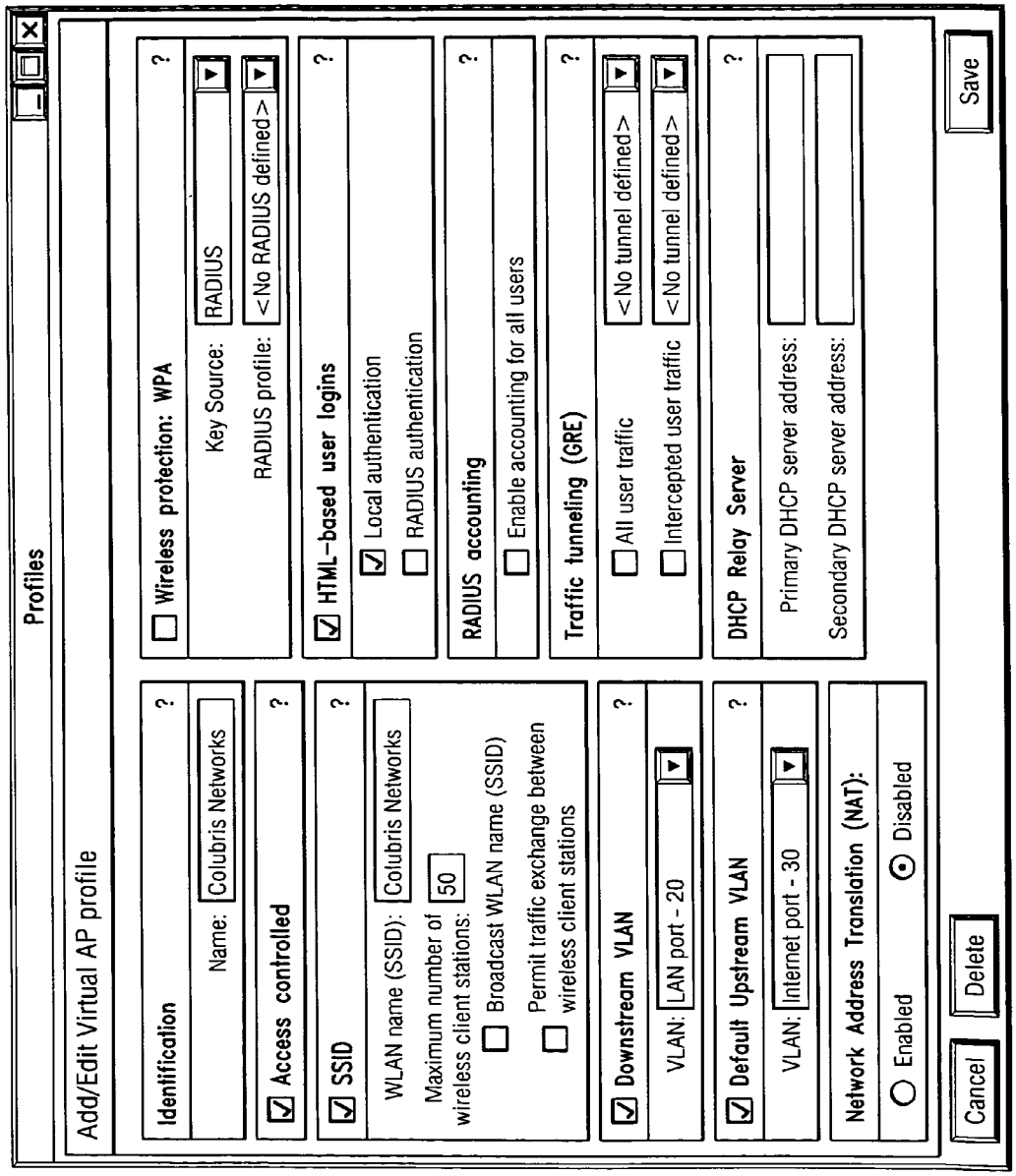
FIG. 9 illustrates a representative display tab of the Web-based interface of FIG. 8 through which an operator may configure the virtual access point characteristics.

Virtual access point (VAP) management and configuration may be accomplished using the Web interface 222 illustrated in FIG. 2. FIG. 8 is a representative Web-based interface through which an operator may create a new VAP profile or select from a list of virtual access points that are configured on the access device. FIG. 9 illustrates a representative display tab of the Web-based interface of FIG. 8 through which an operator may configure the given characteristics of the virtual access point selected from the list. These display formats are merely illustrative, of course.

The present invention has numerous advantages over the prior art. As has been described, the present invention enables multi-service VAP support for multi-user, multi-service environments with the ability to migrate from legacy to next generation Wi-Fi standards, all in a single, shared Wi-Fi network. The invention preferably leverages a single Wi-Fi infrastructure to deliver multiple services at a lower cost. This simplifies multi-service deployment, yet still provides for strict adherence to 802.11 standards. Further, the invention enforces differentiated quality-of-service and security profiles (e.g., VoWi-Fi, secure VPN data, open guest access, and the like). Quality-of-service and security profiles are independently configurable per VAP, which enables new services (high quality voice and video) and new business models. In a representative embodiment, up to given number of services (e.g., 16) converge in a single Wi-Fi network, which eliminates multiple application-specific overlay Wi-Fi networks and eases migration to next-generation security standards. Preferably, each service has a unique BSSID/MAC and can issue its own advertisements, which guarantees interoperability with any Wi-Fi client. Further, the invention provides service isolation and mapping to the wired network. This provides a flexible quality of service for legacy and QoS enabled clients and applications.

The quality of service forwarding engine per virtual access point (VAP) provides flexibility to apply different policy per service (e.g., voice, guest access, data, and the like), and this engine maps policies between the wired network (e.g., Ethernet or WAN) and Wi-Fi networks for end-to-end quality of service. The priority queueing on the Wi-Fi interface comprises up to a given number (e.g., four (4)) transmit/receive queues per VAP that provide flexibility to implement a range of QoS policies. With this architecture, prioritized services always receive first access to the Wi-Fi bandwidth, and the solution still complies with all applicable QoS standards (e.g., 802.11e).

The invention is interoperable with QoS-capable clients. The protocol-based policy enables a given client device to request a given priority (e.g, WMM, SVP support, or the like), and to be part of the end-to-end QoS scheme (from client-AP-Ethernet). In a given embodiment, the VAP service priority preferably assigns all traffic a specific priority, which enables legacy clients and applications to achieve priority queuing, and enables specialized devices to receive priority. The invention also provides for configurable priority per VAP, which enables a network manager to administer priority for an entire network, and provides for easy differentiation between applications (guest access, employee, and the like).

WLAN QoS policy preferably is derived from layer 2 or layer 3 QoS marking (e.g., 802.1p/DiffServ/IPTOS/SVP), which leverages existing network policies. The virtual AP service priority can perform 802.1p or DiffServ/TOS tagging, which enables any WLAN client to receive wired network priority. WMM provides transparent end-to-end QoS mapping. This enables layer 2 protocol-based QoS (802.11e), and up to a given number (e.g., four (4)) classes of service (e.g, voice, video, best-effort, background). The invention also facilitates supports for 802.11e triggered power save mode, which enhances battery life for client devices.

The VAP technology (e.g., up to 16 SSIDs per AP) enables multiple services to be delivered from one AP, customized to application requirements. SSID broadcasts are selectable, which enables a user to select a given service. VLAN per SSID enables support for secure wholesaling. Independently selectable WPA/WPA2, WEP or OPEN security enables the operator to tailor its security policy to resources available on the VLAN and the capabilities of the user devices. Independent mapping to VLAN tags extends the virtual wired LAN segments to WLAN, leverages existing LAN switches and security infrastructure, leverages VLAN security mechanisms, and is otherwise 802.1q compliant.

The invention also permits different layer 2 security options to be active at the same time, per VAP. For example, WPA/WPA2, 802.1x, and WEP can all be active enabling a wide range of client stations to be supported by a single access point. For each SSID configured in the access point, it is possible to select from one or more security methods including, without limitation, VPN, WPA/WPA2, WEP, and unprotected guess access, and then match that security method with an appropriate VLAN group. Upon a positive authentication, e.g., against a RADIUS server, a user is then added to the VLAN group associated to the SSID and receives an IP address from that VLAN group. For additional flexibility, it is possible to extract from the VLAN group Id to assign to the user from the authorization response received from RADIUS. This provides further flexibility because it is achievable without depending on the user selecting the proper SSID to match the required VLAN. Finally, the invention also permits each SSID to be mapped to a VLAN for traffic segmentation.

As previously noted, the per-VAP quality of service (QoS) function enables support for legacy user devices (STAs) that do not take an active role with regard to defining or enforcing quality of service. In this scenario, a VAP can be configured to operate at a specific QoS level for all the traffic on the associated BSSID. In such case, the VAP enforces the required queuing policies as if the devices were to actively mark the traffic (such as with IEEE 802.11e, IEEE 802.1p or DiffServ).

The present invention also allows for the mapping of a wireless QoS policy onto an upstream (typically wired) interface. This is independent of the wireless QoS method defined for a specific VAP. Such QoS typically comprises priority queuing along with layer-2 (IEEE 802.1p) or layer-3 (DiffServ or TOS) markings to allow end-to-end QoS between the client device and the remote destination.

To further prioritize traffic within a given class of service, the present invention allows for the determination of priority rules based on a given protocol or IP port number. This is quite useful when a client device supports multiple connections or streams over a single VAP, and where there is no explicit QoS tagging to indicate the relative priority between these streams or connections. For example, this function may be applicable to a videoconference application where the voice stream should be prioritized over the video stream.

The VAP data packet forwarding engine preferably supports multiple/different streams or connections on a legacy user device unable to support 802.11e (WMM). When the user device is unable to explicitly tag its traffic for a given QoS, each VAP can be instructed (e.g., via configuration or as part of a user profile extracted from a AAA Server during authentication) about the priority to assign to different ports or protocols to mimic the capabilities offered by IEEE 802.11e without any involvement by the user device.

While aspects of the present invention have been described in the context of a method or process, the present invention also relates to apparatus for performing the operations herein. As has been described above, this apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs on a server on a standard Intel hardware platform running an operating system such as Linux.

While given components of the system have been described separately, one of ordinary skill will appreciate that some of the functions may be combined or shared in given instructions, program sequences, code portions, and the like.

Finally, while the above text describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described our invention, what we now claim is as follows.

What is claimed is:

1. An apparatus for coupling a wireless network to a wired network and that includes a radio configurable to support virtual access points, comprising:
    a plurality of queues associated with each virtual access point (VAP) configured, wherein each queue in the plurality of queues is associated with a given quality-of-service level;
    a data transfer mechanism for each VAP that transfers data from the plurality of queues to enforce a per VAP quality-of-service policy; and
    a mechanism to guarantee a given minimum service level to a device requesting to be added to a given VAP QoS level.

2. The apparatus as described in claim 1, wherein a first queue in the plurality of queues provides a quality of service at a first level.

3. The apparatus as described in claim 2, wherein the data stored in the first queue is voice data.

4. The apparatus as described in claim 2, wherein a second queue in the plurality of queues provides a quality of service at a second level that is lower than the quality of service at the first level.

5. The apparatus as described in claim 4, wherein the data stored in the second queue is video data.

6. The apparatus as described in claim 4, wherein a third queue in the plurality of queues provides a quality of service at a third level that is lower than the quality of service at the second level.

7. The apparatus as described in claim 6, wherein the data stored in the third queue is data other than voice and video data.

8. The apparatus as described in claim 1, wherein the data transfer mechanism transmits all of the data in a queue at a first quality-of-service level before initiating transmission of data in a queue at a second quality-of-service level.

9. The apparatus as described in claim 1, further including an interface through which a given client security policy is specified, wherein each VAP includes a given client security policy.

10. The apparatus as described in claim 1, further including a mechanism for mapping a given QoS policy from a first, downstream interface to a second, upstream interface, wherein the downstream interface is a wireless network.

11. The apparatus as described in claim 10, wherein the QoS policy mapping is between 802.11e and a protocol selected from one of the following: 802.1 p, DiffServ and MPLS.

12. The apparatus as described in claim 1, wherein a given queue has one or more sub-queues associated therewith, wherein each sub-queue provides a quality-of-service sub-level.

13. The apparatus as described in claim 12, further including a mechanism to balance data transfer from the one or more sub-queues according to a given queuing algorithm.

14. The apparatus as described in claim 1, further including a mechanism to enforce a given QoS priority rule within a given VAP with respect to a TCP or UDP destination port.

15. An apparatus for coupling a first network to a second network and that includes a radio configurable to support virtual access points, the apparatus having a first, downstream interface to the first network, and a second, upstream interface to the second network, comprising:
- a set of queues associated with each virtual access point (VAP) configured, wherein each queue in the set of queues is associated with a given quality-of-service level;
- a data transfer mechanism for each VAP to transfer data from the set of queues to enforce a per VAP quality-of-service policy; and
- a mechanism to guarantee a given minimum service level to a device requesting to be added to a given VAP QoS level.

16. The apparatus as described in claim 15, wherein a given VAP is configured to provide a given quality-of-service level for all traffic on an associated BSSID.

17. The apparatus as described in claim 15, wherein the given VAP is configured without active collaboration with a given access device.

18. The apparatus as described in claim 15, further including a mechanism to enforce a given QoS priority rule within a given VAP with respect to a TCP or UDP destination port.

19. The apparatus as described in claim 1, wherein each QoS level has a reserved amount of bandwidth.

20. The apparatus as described in claim 15, wherein each QoS level has a reserved amount of bandwidth.

* * * * *